Oct. 14, 1958    H. N. McNAIR ET AL    2,856,234
LIQUID PROPORTIONING DEVICE
Filed May 28, 1952    2 Sheets-Sheet 2

INVENTORS
Hugh N. McNair
Alfonso L. Dintino
BY Bennett. H. Levenson.
ATTORNEY

2,856,234
LIQUID PROPORTIONING DEVICE

Hugh N. McNair and Alfonso L. Dintino,
New Dorp, N. Y.

Application May 28, 1952, Serial No. 290,382

19 Claims. (Cl. 299—84)

This invention relates to the art of dispensing materials by a fluid vehicle under conditions of controlled concentration and automatic proportioning. More particularly, it pertains to the distribution of a chemical substance by a liquid vehicle in predetermined regulated concentration, and is especially applicable to the controlled mechanical admixture with a liquid vehicle of chemical substances for dissemination in any expedient manner, as by spraying, diffusing, or the like.

To facilitate a consideration of the invention herein, reference is made in the following description to such chemical substances as insecticides, fertilizers, et cetera, merely by way of desirable illustration. With respect to the fluid vehicle, this is exemplified by water, and the chemical substance intended for dispensing is preferably in the liquid state, including within this category solutions, emulsions and dispersions in concentrated, anhydrous or other form. It will however be understood that the scope and purport of the invention is not intended to be restricted in its adaptations to these materials, although they fall within the purview of desirable embodiments.

Various ramifications of apparatus and process have been resorted to in the prior art for effecting the distribution of diversified chemical solutions, in predetermined concentration. While a measure of utility and effectiveness have been afforded by known methods and devices, they have not been free from generally recognized shortcomings and objections.

One of the principal forms of proportioning devices in the prior art is that referred to as the suction pick-up or syphon type device, which may be adapted for portable use. Such devices involve the coordination of a conduit or line, for the passage of a liquid vehicle therethrough, with a container having a liquid chemical substance therein, the flowing stream of vehicle through the conduit being adapted to create a syphoning action or suction for removing the chemical liquid or solution from the container for admixture with the vehicle.

Among limitations of such devices, they are subject to substantial pressure loss in operation, and are comparatively ineffective under any significant back pressure in the line. Thus they usually necessitate relatively close proximity to the outlet of the conduit for attaining any practicable usage. Moreover of special significance is their proportioning inaccuracy under the fluctuations in pressure and flow that are usually encountered with respect to the vehicle in its passage through the conduit or line.

A more reliable type of proportioning device is the hydraulic pump type structure, wherein a positive displacement piston pump is activated by the line pressure of the vehicle, such as water, to inject a metered amount of liquid concentrate into a chamber for admixture with the vehicle. Such devices are relatively complex as to their structural details, and in addition to the matter of economic feasibility, they are generally cumbersome and lacking in expedient portability, as well as simplicity of operation.

Another device known to the prior art for effecting a proportioned dispensing of chemical substances in a flowing stream of vehicle, and which lends itself to portable adaptation, is that in the category of a mixing chamber correlation. Such devices may comprise a conduit adapted for connection with a vehicle flow line, such as a water line or hose, and a container or reservoir of the chemical substance which is to be dispensed, said container being coordinated with said conduit by ingress and egress ports or passages. Thus a divergent flow of vehicle passes from said conduit, through the ingress passage into the container, which in effect functions as a mixing chamber, the chemical substance admixed with vehicle flowing from the said container through the egress passage for admixture with the stream of vehicle in its flow line.

In such mixing chamber type of devices, the by-pass or diverted flow of material into the container results in a distinct turbulent effect, introducing a substantial discrepancy in the proportioning of chemical substance with the flowing stream of vehicle passing through the conduit or line. Thus the result of the attendant turbulence is the dilution, dispersion or emulsification of the chemical substance in the container, dependent upon the characteristics of the said substance. Since the admixture of chemical and vehicle which passes from the container through the egress conduit is replaced by vehicle per se, there is a progressive diluting action manifested in the container and a corresponding reduction in the ratio of the chemical substance to vehicle which is supplied to the flowing stream of vehicle passing through the conduit or line.

It is an object of this invention to obviate such difficulties and uncertainties as hereinabove indicated.

Another object is to attain a portable, sturdy, efficient proportioning device of relatively small size and simplified structure adapted for expedient removable attachment, at substantially any point, to a conduit or line, through which a stream of liquid vehicle may flow and, dependent upon the flow of liquid vehicle in said line or conduit, adapted to automatically supply a chemical substance to the flowing stream in a substantially constant concentration, within a wide range of pressure and velocity variations that may be applicable to the vehicle flow.

A significant object is the production of an efficient proportioning device of simplified structure adapted for expedient correlation with a conduit or line through which a stream of liquid vehicle may flow and, wherein a by-pass or divergent flow of the vehicle stream is adapted to function as a positive actuating means or medium for automatically supplying chemical substance from a container to the flowing stream of vehicle for solution, dispersion or emulsification in said flowing stream, and substantially without any solution, dispersion or emulsification of the chemical substance in the actuating means within the container.

Other objects, advantages and features of the invention will become apparent from the following description, read in conjunction with accompanying drawings, wherein similar elements are designated by like numerals.

In its adaptation, the invention involves automatically supplying a chemical substance to a flowing stream of vehicle, such as water, by resort to a pressure differential in the conduit or line through which the vehicle flows, and correlating this pressure differential with the container wherein there is initially retained the chemical substance intended for admixture with the vehicle. The container is connected by an ingress port or conduit to the high pressure side of the vehicle flow line, whereby a by-pass flow of vehicle enters the container through said ingress conduit. An egress port is provided between the container and the low pressure side of the vehicle flow line for the passage of chemical substance into the vehicle stream for admixture therewith.

Without intending to be restricted in terms of any theory or explanation, it has been ascertained within the purview of the present invention that the divergent or by-pass flow of vehicle through the said ingress conduit into the container may be adapted to function as a positive actuating means capable of forcing the chemical substance from the container into the flowing stream of vehicle, while essentially avoiding turbulence during the said actuating function and substantially without effecting any solution, dispersion or emulsification of the chemical substance in the said liquid actuating medium, irrespective of any such inherent tendency normally manifested between the vehicle and the chemical substance. In effect the by-pass flow of vehicle, from the high pressure side of the vehicle flow line or main conduit, into the container affords a piston-like action, substantially free from any attendant turbulence, to cause the chemical substance within the container, desirably in a liquid state, to pass through the egress conduit into the low pressure side of the said main conduit and into the flowing stream of vehicle for admixture therewith.

This piston-like function of the vehicle within the container is attributed to the reduction in the velocity of the by-pass flow of vehicle as it enters the container, to an extent obviating turbulence, and resulting in the "layering" or dispersal of the by-pass vehicle entering through the ingress conduit on a surface of the chemical liquid within the container without any agitation or admixture therewith.

For effecting a concentration control of the chemical substance in the flowing stream of vehicle, an appropriate metering means is provided with respect to either the ingress conduit or the egress conduit. In accordance with the preferable adaptation of the invention herein, the metering is attained by regulation of the divergent or by-pass flow or vehicle through the aforesaid ingress or flow-diverting conduit into the container, and for optimum control, the supply of chemical substance from the container for admixture with the flowing stream of vehicle in the main conduit is attained where the egress conduit connects with the restricted portion of the vehicle flow line. Thus with the metering applicable to the by-pass flow of vehicle from the high pressure side of the main flow conduit into the container, and the supply of undiluted chemical substance in predetermined concentration at the restricted portion of the main flow conduit, comprising the low pressure side of the flowing stream of vehicle, there is afforded a fixed proportioning ratio of chemical substance to the flowing stream of vehicle, notwithstanding a substantial fluctuation in pressure and velocity applicable to the vehicle flow, or such other factors as viscosity variation in the chemical substance.

With reference to the optimum structural adaptation of the invention, it comprises a main conduit or section thereof through which the vehicle flows, the said main conduit being provided with a venturi as a flow restricting means, and an ingress port or conduit connecting the high pressure side of the conduit or conduit section with the container, for the by-pass flow of vehicle through said port into the container. Desirably the outlet from the container comprises an egress port or conduit connecting the throat portion of the venturi with the container. In the preferred aspects of the combination, the ingress and egress ports or conduits are desirably at the same end of the container, and may be integrally coordinated with the aforesaid main conduit or conduit section provided with the venturi, as the flow restricting means for the stream of vehicle passing therethrough. Moreover the said main conduit or conduit section is adapted for the combination therewith of a chemical container, the said container being correlated with the aforesaid ingress or egress conduits, and subject to expedient attachment to as well as removal from the aforesaid main conduit or conduit section.

Figures 1, 2, 3, 4, 5, 6:
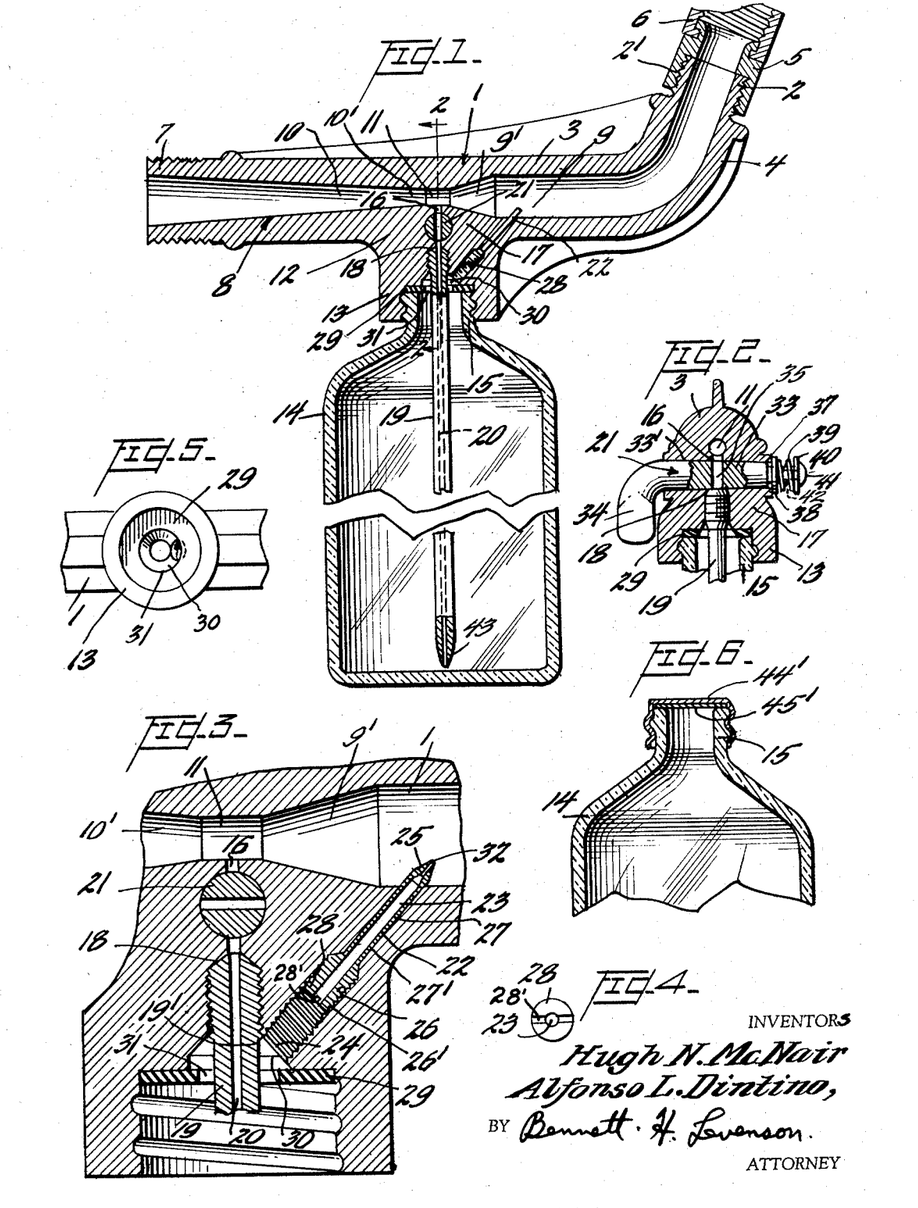
Fig. 1 comprises a vertical longitudinal section indicative of an optimum embodiment of the invention, including in the combination shown a removably attached chemical container.
Fig. 2 is a vertical transverse section taken on line 2—2 of Fig. 1, with a fragmentary showing of the neck portion of the container in its relative position.
Fig. 3 relates to a detailed fragmentary vertical section, on an enlarged scale, pertaining to the device of Fig. 1, including the coordinated elements for automatically effecting the controlled proportioning function and the supply of the chemical substance to a flowing stream of liquid vehicle.
Fig. 4 is drawn to an end view of the metering jet shown in Fig. 3.
Fig. 5 pertains to a fragmentary bottom plan view, particularly indicating the correlation of the openings of the passages within the header shown in Figs. 1 and 3.
Fig. 6 is directed to a fragmentary vertical section of an illustrative container, including a seal and closure therefor, prior to its coordination with the proportioning means pursuant to Fig. 1.

Referring more particularly to the features of invention embodied in the modifications shown by the various figures of the drawings, Fig. 1, as previously indicated, comprises an optimum embodiment of the device, and is primarily intended for the adaptation of the usual type of chemical concentrates having a specific gravity at least equal to or in excess of the liquid vehicle, usually water. It will however be understood that with minor variation, merely with respect to the length of the egress conduit of Fig. 1, the device is adapted for utilization of other types of concentrates, such as those of a specific gravity in excess of that applicable to the vehicle, including the type which manifests the characteristic of permitting the vehicle, such as water, to diffuse therethrough without turbulence or emulsification, where the vehicle is supplied pursuant to the quiescent layering of the present invention.

The main conduit 1 may desirably comprise a flow line section or conduit adapted for attachment at its end 2 to a source of vehicle supply, such as water. It will be noted that portion 4 of the conduit 1 is shown angularly disposed relative to the longitudinal portion 3, this relationship being merely to facilitate the connection of conduit 1 with a pipe, spigot or flexible hose line through which the vehicle is available, as from the municipal water mains. However there is no intent whatever to restrict the configuration of the conduit 1, or the correlation of parts 3 and 4 thereof, to any particular design, especially in view of the wide and diversified adaptations of the invention.

A preferred fabrication of conduit 1 and header 12 is that of a unitary casting, which may be derived from any desirable material, such as metal, rubber or synthetic resin by way of illustration. As shown in Figs. 1–3, the casting expediently comprises a plastic or synthetic resin material. It will however be apparent that the various parts of the device, such as conduit 1 and header 12 may be separate individual members correlated in any expedient manner known to the prior art.

The said end 2 of conduit 1 may desirably be externally threaded as at 2', for correlation with a connector means 5 or the like. An internally threaded coupling 6 is likewise designated to effect the attachment of the device to the water line or the like, as aforesaid, the said coupling being shown rotatably mounted on hose connection 5.

The outlet end 7 of conduit 1 may be provided, pursuant to dictates or preference, with an external thread, and if desired, appropriate coupling means, similar to that indicated at end 2 may likewise be coordinated therewith. Thus the details of end 7 are intended to conform with any suitable expedients for effecting the attachment of conduit 1 at its outlet end to the dispensing or distributing means either directly, or through intervening connection conduits, and likewise the details of conduit end 2 may be subject to variation, dependent upon the applicable circumstances prevailing with respect to a suitable coordination of conduit 1 with the vehicle supply means.

Within conduit 1, an optimum flow restricting means comprising venturi 8 is provided, the inlet and high pressure side and the outlet or low pressure side 10 of conduit 1 being duly correlated with the venturi throat portion 11. The said venturi 8 may fully conform with the theoretical or mathematically expressed requisites, wherein the upstream portion or frustum 9', corresponding with high pressure side 9 of conduit 1, gradually converges to a vertex angle of 25°–30°, at the restricted zone or throat 11, while the outlet frustum or downstream portion 10' of the venturi, conforming with low pressure side 10 of conduit 1, gradually expands or diverges at an angle of 7° or less to merge with the full diameter of the conduit. (See Chemical Engineer's Handbook, by John H. Perry, 2nd edition, 1941, pages 843, 844 and 855, published by McGraw-Hill Book Company, Inc.)

It has however been found that quite accurate and entirely satisfactory results are attainable by resort to a partial venturi, and this is particularly expedient with respect to the present invention in view of the relatively small longitudinal dimension which may apply to conduit 1. The partial venturi, as contemplated herein, comprises a curtailment in the frustum of both the upstream or inlet side of the venturi and the downstream or outlet side thereof, particularly the latter, whereby the respective angular convergence and divergence may be in excess of that conforming with the mathematical requirements of a theoretical venturi.

Downwardly projecting from conduit 1 there is shown in Fig. 1 a combined header and closure type member 12 which includes a peripheral flange portion 13 adapted as a closure attachment to a receptacle or container 14, intended to be supplied with a chemical substance or composition contemplated for dispensing. The said closure 13 is desirably threaded on its internal surface and adapted to receive in appropriate attachment the externally threaded neck portion 15 of the container, whereby the said container may be removably affixed to closure element 13 for coordination with conduit 1 through header 12.

The said header 12, as shown in Fig. 1, may desirably be a unitary part of the integral casting determining conduit 1, from the standpoint of economic feasibility and manufacturing expediency. Nevertheless header 12 and conduit 1 may comprise distinct members, the subject of separate manufacture and adapted for coordination, removably or permanently, as an integral attachment.

As indicated in Fig. 1, header 12 is positioned in coordinated association with venturi 8, whereby a valve controlled port 16, extending from throat portion 11 of the venturi through the body portion 17 of the header, opens into pocket or seat 18, adapted to receive conduit 19.

The coordination of conduit 19 with header 12 in seat 18 may be in any expedient manner illustrated by a press fit association or a threaded coordination, the latter being shown in Fig. 1. It will be noted that passage 20 of conduit 19 in effect comprises an extension of port 16, and conduit 19 is adapted for positioning within container 14, when the latter is attached to closure 13.

The said conduit 19 in effect provides the egress passage from container 14 through valve 21 into throat portion 11 of venturi 8. The ingress passage from conduit 1 into container 14 is determined by conduit 22, which affords a port or passage 23. Thus ingress conduit 22 comprises a means for a by-pass flow from the high pressure side 9 of conduit 1, with reference to venturi throat 11, while egress conduit 19 provides the means for a return flow from container 14 into conduit 1 on the low pressure side thereof.

For optimum operation, the said return flow is directed to throat 11 of the venturi, in order to attain maximum control of the proportioning ratio of chemical substance from container 14 to flowing vehicle in conduit 1. It will however be understood that the egress flow from conduit 19 may be directed to any other expedient point on the low pressure side 10 of conduit 1, such as at the downstream frustum 10'. Such variation will also include a conforming repositioning of valve controlled port 16, in order to effect the through passage flow into the said outlet or low pressure side 10 of conduit 1.

The tapered end 25 of conduit 22 may desirably be provided with an orifice opening 32. Thus conduit 22 is in essence an extremely accurate metering jet applicable to the by-pass flow of vehicle, such as water, from the high pressure side 9 of conduit 1 into container 14 at the inlet end thereof determined by neck portion 15. In order to minimize any clogging tendency of the port 23 of metering jet 22, especially at the orifice opening 32 thereof, or the passage 20 of egress conduit 19, as the result of extraneous particles which may be carried by a flowing stream of vehicle, the said tapered end 25 desirably projects for a reasonable distance into conduit 1, since the internal body of a flowing stream is normally free of foreign matter.

The metering jet 22 may be integrally coordinated within header 12 in any expedient manner as by being internally cast therein, or when formed as a separate member, it may be press fitted or threadedly coordinated therewith in an appropriate opening. With reference to the effective attachment shown in Figs. 1 and 3, externally threaded portion 26 and relatively reduced stem portion 27 of metering jet 22 are adapted for coordination with the seats or recesses 26' and 27' of corresponding design provided in the header to receive said jet portions 26, 27, the former being threadedly affixed to the internal threads of recess portion 26'.

As above indicated tapered end 25 of metering jet 22 projects from recess portion 27 into conduit 1. On the other hand, end 28 of the metering jet opens into the zone 24, corresponding in diameter with the aforesaid threaded seat or recess 26' and comprising an abrupt enlargement relative to the dimensions of the passage 23 within said metering jet 22. It is noteworthy that this relationship between passage 23 and zone 24 will result in a very substantial reduction in the velocity of the by-pass or divergent flow into the container. The said velocity diminution is further contributed to by the zone 30 within the header, into which the by-pass liquid flows from zone 24, since the said zone 30 in effect comprises a substantially enlarged expansion chamber relative to zone 24. Thus port or passage 23, zone 24 and zone 30 together determine in effect an integral by-pass or flow-diverting conduit providing three zones or passages which are sequentially or progressively enlarged.

Moreover the angular disposition per se of metering jet or conduit 22 through the header 12 likewise is of significance for optimum results in effecting the velocity diminution of the by-pass flow to container 14. In addition the orientation of said metering jet 22 may manifest a contributive function in dispersing the effluent to attain a quiescent "layering" or deposit without turbulence, of the divergent flow on the surface of the liquid in container 14. Furthermore metering jet 22 may be instrumental, by virtue of its correlated positioning, in channelling or directing the said divergent effluent relative to the liquid surface in container 14.

Thus as shown in Figs. 1–3, the by-pass liquid on issuing from end 28 of metering jet 22 into zone 24 and thence into zone 30 will be subject to a baffle effect by washer or gasket 29 and/or impingement on the exterior surface of egress conduit 19, such as along portion 19' thereof. As a result of either or both of these obstructive functions by washer 29 and portion 19' of conduit 19, the by-pass liquid will flow through opening 31 of the gasket or washer 29, into the neck portion of the container and may be channelled along conduit 19 in relatively small modicums, such as a film, until it is "layered" or dispersed on the surface of the liquid within said container 14.

It will be understood that the velocity reduction of the by-pass flow, such as that effected by its passage through a plurality of sequential or progressive enlargements, comprises a significant factor in attaining a quiescent, non-turbulent disposition of the said by-pass flow within the chemical container, quite apart from subjecting the by-pass flow to the effect of impingement and/or baffle treatment. Similarly the resort to impingement and/or baffle means may per se comprise substantial factors in affording the desired disposition of the by-pass flow within the container under conditions of minimum turbulence as a substantially quiescent layer. This latter expedient is exemplified where the by-pass flow is conducted directly from the metering jet or from an enlarged zone, such as either zone 24 or zone 30, through an appropriate conduit extending substantially to the inner surface of the container bottom, which conduit may be similar to conduit 19, whereby the said by-pass flow is subjected to an impinging contact with the bottom of the container in its disposition therein as an upward functioning piston-like quiescent layer of vehicle. It will be noted that such an upwardly directed actuating pressure is desirable where the specific gravity of the chemical substance in the container is less than that of the specific gravity of the vehicle. In any event, the aforesaid details of impingement and baffle effect may be elements contributing to optimum results rather than restrictive factors when coordinated with the velocity reduction provided by a plurality of sequential or progressive enlargements in the by-pass flow.

The extent of flow, if any, of the aforesaid by-pass film along conduit 19 will depend on the content of liquid within container 14. Thus it may be primarily applicable on the initial coordination of the said container with the proportioning device as an integral part thereof, if the chemical content therein does not fill the container. However after the proportioning operation has commenced, the liquid content within container 14 will substantially completely fill the same including the neck portion thereof, and under such circumstances, the flow of by-pass film along the surface of conduit 19 may become negligible.

For optimum operation, it is desirable that the modicum or film of by-pass flow should be supplied substantially in the center of the neck of the container, normally corresponding with the position of egress conduit 19 therein, to radiate evenly and/or equally on a horizontal plane, thereby minimizing any tendency to a greater pressure on one side of the liquid in the container than on the other side. Although effective operative results may be attainable, pursuant to the invention, even where the by-pass flow enters the neck of the container at a point spaced apart from the aforesaid approximate center point, and with or without impingement on conduit 19, a minimum and substantially negligible turbulent effect is afforded by the aforesaid optimum conditions.

An extremely accurate proportioning is effected by the relative dimensions of the cross sectional area of the orifice 32, at the tapered inlet end 25 of metering jet 22, and the cross sectional area of the venturi throat 11. It is through this relationship between jet orifice and venturi throat that the accurate metering of the supply of chemical substance from container 14 into venturi 8 of conduit 1 is attainable, since it reflects the ratio of the quantity of chemical concentrate from container 14 to the quantity of water in the end product which is to be dispersed or disseminated. By way of example, if a 1% concentration is desired, the jet orifice 32 will be $\frac{1}{100}$ the area of the venturi throat 11, allowance being made for the greater proportional frictional losses encountered in the said orifice.

By the same token, it will be understood that the concentration may be subject to variation through the expedient of altering the cross sectional relationship or ratio between the orifice and the venturi throat. Such variation may be effected by replacing any given metering jet 22 in header 12 by another having an orifice cross section which affords the requisite relationship with the venturi throat cross section, conforming with the concentration desired, frictional losses being compenated for as aforesaid. It will be seen in this connection that end 28 of metering jet 22 is provided with a slit 28' adapted for the utilization of a screw driver or the like for its removal and substitution by another jet of predetermined ratio relative to venturi throat 11.

Of significance is the fixed ratio of proportioning afforded by the said combinative relationship of orifice meter and venturi throat, which is constant through a wide range of pressure and flows, whereby the desired ratio of concentrate to vehicle, such as water, is automatically and accurately maintained under varying conditions of operation, and without the necessity of any manual manipulations of valves. Such control is unattainable with any semblance of corresponding constancy with other types of flow restricting means, such as orifice plates, nozzle type means, et cetera.

The accuracy of the proportioning, pursuant to the present invention, is further enhanced by positioning the metering jet 22 as a by-pass means for effecting a divergent flow from the high pressure side of the vehicle into the container as in Figs. 1 and 3. By way of illustration, where the vehicle is water, no variable factors will be introduced, such as that of viscosity or surface tension changes, in view of the relatively consistent properties of water, and the same may be applicable to other utilizable vehicles that likewise manifest such consistent characteristics.

It will however be understood that where constant concentration ratios of chemical substance to water is not of critical interest, insofar as the metering jet per se is concerned, it may be omitted. Alternatively it may be positioned on the return flow side for the passage of chemical from the container into the low pressure side of conduit 1, as at throat 11 thereof. Thus where the invention primarily is to attain a non-turbulent piston-like actuating force by the vehicle, the by-pass flow to the chemical container may be adapted to afford the desired velocity reduction by the expedients of conducting the by-pass flow into an abrupt zone enlargement, such as zone 24, zone 30 or equivalents thereof; and reliance upon appropriate baffles and obstacles upon which the by-pass flow may be impinged, and if desired channelled, to the end that a quiescent "layering" deposit of the by-pass flow is effected.

With reference to the valve 21, as shown in Fig. 2 it comprises a stem portion 33 integral with valve handle 34. The port 35 extending through the stem body is adapted for alignment on one end with port or passage 16 leading to the venturi throat 11, while at its other end, it connects with the portion of said port 16 adapted for correlation with passage 20 of egress conduit 19. By rotating stem 33, it will be clear that the continuity of passage between conduit 19 and venturi 8 may be obstructed, thereby preventing the flow of chemical from container 14 into the flowing stream of vehicle in conduit 1.

Valve stem 33 projects through opening 33' in the upper portion of header 12 and contiguous venturi throat 11. The end thereof opposite valve handle 34 projects through the body of the header at 37, with washer 38 seated at the said point of emergence 37. Spring element 39 is positioned over stem 33 against said washer 38. The other side of the spring contacts washer 40 which is seated against head 41 of screw 42 threadedly attached to the end of the stem. It will be understood that this manner of retaining stem 33 in place within its seat, which is opening 33', may be subject to variation as desired. Likewise other types of valves may be utilized pursuant to the status of the art.

Moreover the position of the valve is subject to variation, since it may be quite effectively located at any expedient point in the by-pass conduit or line of flow. In addition, it should be noted as within the contemplation of the invention that the metering jet may be correlated with the valve as an integral part of the valve structure, and illustratively the ports in the valve body, such as port 16, may comprise a passage of predetermined diameter, thereby affording a selective or metering function. Desirably the said passages of the valve may have an orifice at one end thereof, whereby the said passage corresponds with the structural characteristics of metering jet 22. Further noteworthy as within the scope of the disclosure herein is the provision in the valve of a plurality of such metering jets or passages differentiated as to their diameter or orifice size, the said jets or passages being adapted to afford alternative selections concerning the proportioned concentration of the chemical concentrate in the flowing stream of vehicle.

Container 14 is desirably a glass bottle having a relatively small neck 15 which may desirably be approximately 1 inch in diameter, although there is no intent to be restricted thereto. It will be noted that the container comprises an integral part of the combination with conduit 1 during the operation of the device, the said combination functioning as a dispensing device for chemical substance from the container in predetermined and controlled proportion into a flowing stream of vehicle passing through conduit 1. Thus the characteristics of the combination, as shown in Figs. 1 and 3, involve the existence of a substantial pressure within the container, determinable on the basis of the pressure existing in the line of vehicle flow. Thus in the case of water supplied by municipal mains, the pressure may be of a magnitude up to approximately 75 pounds per square inch.

Pressures of the scope applicable to the adaptation of the invention have resulted in a serious breakage factor in the case of conventional wide necked glass containers which have been heretofore utilized for the supply of chemical substance to the flowing stream of vehicle. Thus the threads of such containers have been incapable of withstanding the total applicable pressure. By resort to a relatively small necked bottle, such as bottle 14 herein, the total pressure exerted upon the threads of the bottle is quite substantially reduced, in pounds per square inch, this reduction being to an extent at which the breakage hazard is practically eliminated.

Moreover the comparatively narrow necked bottle, such as container 14, correlated with the conduit 1 and by-pass or divergent flow conduit 22, contributes to the obviation of turbulence, as the effluent by-pass stream is first channelled through neck 15 along conduit 19 for quiescent dispersal and "layering" on the liquid surface within container 14.

As shown in Fig. 6, container 14 may be provided with a seal 45' and a closure 44' threadedly correlated with the neck 15 to contact the said seal on the inner surface of the said closure. If desired the said egress conduit 19, at its tapered end 43 may be adapted to puncture the said closure 44' and the seal 45' beneath the same. Alternatively the closure 44' may be removed prior to the puncturing of seal 45' by egress conduit 19.

It will be seen that where conduit 19 manifests a divergence at the tapered end 43 thereof, puncturing the seal 45' and/or closure 44', an opening will be afforded, corresponding with opening 31 in Figs. 1 and 3, for the passage of effluent from metering jet 22 and zone 30 into the neck of container 14, the punctured seal functioning as a gasket or washer, as well as a baffle with respect to the by-pass flow. In any event, irrespective of the manner of effecting the opening in the puncturable seal and/or cap, for the extension of conduit 19 into the container, the said opening should be adapted for the expedient flow of by-pass fluid therethrough from zone 30. Concerning the material of the seal, it may comprise paper, "cellophane," or a puncturable plastic, caused to adhere in any desirable manner to the rim of the bottle, underneath the cap or closure, if the latter is contemplated. Similarly the derivation of the closure or seal may be subject to variation, and dependent on whether or not it is intended to have the same puncturable.

Concerning the operation of the modification shown in Figs. 1–5, it will be seen that with valve 21 rotated to close passage 16, leading from venturi throat 11, and also the passage 20 of conduit 19, water entering at end 2 of conduit 1 will flow therethrough to the outlet end 7. In this setting of valve 21, no chemical substance from container 14 would be supplied to the flowing stream of water. On the other hand, with valve 21 in open position, as shown in Fig. 1, the device is adapted for the controlled dispensing of chemical substance from container 14 in predetermined concentration relative to the flowing stream of water through conduit 1.

Thus water from the high pressure side 9 of conduit 1 will be diverted through metering jet 22, entering orifice 32 and flowing through the relatively enlarged port or passage 23. After it emerges from the said metering jet at 28 into zone 24, comprising an abrupt enlargement, and then passes through a further expansion zone 30, it may be subject to the baffle function of gasket or washer 29, and impingement against portion 19' of egress conduit 19. Thus the effluent from the said metering jet 22 undergoes a substantial velocity reduction in the said sequential relatively enlarged passages or zones 23, 24 and 30, while encountering the aforesaid obstructive and impinging function.

From zone 30, the water effluent from metering jet 22 passes through opening 31, circumventing the said portion 19' within the header of the conduit 19, which extends through the said gasket or washer 29 substantially to but spaced apart from the bottom of the container 14. The by-pass flow is thus supplied to the neck portion 15 of the container 14, at substantially the center thereof, for optimum operation, and is channelled through the neck and into the body of the container in a direction substantially perpendicular to the surface of chemical substance within container 14. On contacting the said surface of the chemical substance, preferably in a liquid state, the flowing film by-pass is disposed in a relatively quiescent state within the container, to manifest a piston-like nonturbulent actuating pressure in a plane parallel to that of the said chemical surface.

As the result of the aforesaid actuating force or pressure manifested by the effluent deposit within container 14 being greater than the pressure existing within the venturi throat, the chemical substance within said container is caused to flow from the bottom of the said container into tapered end 43 of egress conduit 19, thence upwardly through the said conduit 19 and through port 16, including the intervening valve port 35, emerging into conduit 1 at throat 11. Thus the chemical liquid becomes admixed in the venturi throat with vehicle flowing through conduit 1, the concentration being in a substantially constant proportion, by virtue of the function of the aforesaid metering jet 22. The resultant composition, comprising vehicle and chemical substance, flows through the low pressure side 18 of conduit 1 to outlet 7, and thence to the locale at which it is to be dispensed or disseminated, by any supplementary flow lines attached to said outlet 7 of conduit 1.

As shown in Fig. 1, egress conduit 19 desirably extends at its tapered end 43, in substantial proximity to the bottom of container 14. This comprises a preferred adaptation in order to facilitate complete utilization of the chemical substance within container 14. In addition it affords optimum conditions of operation, where the chemical substance comprises a liquid manifesting a specific gravity at least equal to, or preferably in excess of the vehicle such as water.

It will however be understood that the length of conduit 19, relative to the bottom of container 14, may be subject to variation pursuant to preference or in the light of other factors which may apply.

By the same token, it will be clear that the coordination of conduit 19 with the device may be subject to variation or omission, where the specific gravity of the chemical substance is below that of the vehicle, such as water. In this connection, the by-pass flow of water or other vehicle may attain a quiescent layering at the bottom of the container as a result of the inherent characteristics of the chemical, which may be of a type permitting the vehicle, when supplied in a quiescent state, to pass through the chemical without mixing or emulsifying therewith or being dispersed therein.

Alternatively where the chemical is of a conventional type manifesting a specific gravity less than that of the vehicle, the vehicle may desirably be directed to the lower surface of the container in a manner to effect a quiescent layering thereof in a horizontal plane manifesting a piston-like, uniform pressure upwardly on the chemical substance in the said container. Thus the by-pass flow of vehicle will preferably enter the container substantially at a point along the vertically directed center axis thereof. Merely by way of illustration, a conduit similar to 19, having a diameter substantially corresponding thereto at its upper end and likewise extending substantially centrally of the container to a point contiguous the bottom thereof, the said conduit, if desired being enlarged toward its lower end, with or without baffle and impinging means therein, may be directly coordinated with metering jet 22, whereby the by-pass flow of vehicle would enter the container in substantial proximity to the lower inner surface thereof and desirably in impingement relation therewith. Thus the by-pass flow would be subject to a quiescent layering on or adjacent to the said inner surface of the container bottom. In this event, the egress flow of chemical substance actuated by the non-turbulent piston-like upwardly directed pressure of the "layered" or dispersed vehicle will function to supply the chemical substance to the venturi throat directly through a conduit, corresponding with port 16, and opening into the neck portion of the container for the egress flow from the said container.

Alternatively the conduit similar to conduit 19 as aforesaid, in lieu of being directly connected with the outlet end 28 of the metering jet, may be coordinated, as a part of the over-all by-pass conduit, directly with zone 24. It will however be understood that other expedients of supplying the by-pass or diverted vehicle flow to the bottom of the container, that is, below the surface of the chemical substance therein, may be resorted to within the concept and scope of the present invention, for affording the aforesaid preferred requisites of quiescent layering and non-turbulent pressure actuation.

The applicable dimensions of the respective elements and members of the device shown in Figs. 1–5 may be subject to wide variation, pursuant to dictates and preference. Merely to afford an indication as to the practicability in size of the attachment, the length of conduit 1, exclusive of the angularly disposed end portion 4 thereof, may be approximately 6¼ inches, measured along the internal axis thereof, with the said elbow portion 4 comprising approximately 1¾ inches, and the pertinent internal diameter may be approximately ⅝ inch. As for egress conduit 19, which may desirably be of transparent plastic derivation, the over-all length thereof, for a bottle container having a total height of approximately 6½ inches, may be 7 inches, including the upper threaded portion of approximately ¾ inch, it being noted that the upper end thereof is appropriately positioned or seated in a recess provided therefor within the header 12, whereby the lower tapered end 43 is spaced apart from the container bottom internally thereof.

As for the metering orifice, the diameter thereof may be approximately 1/64 inch, and the venturi throat may have a diameter of approximately ⅕ inch. It will be understood however that there is no intent to be restricted to such relative dimensions, in view of the diversified circumstances and field of application to which the invention pertains.

With respect to an illustrative indication of applicable dimensions pertaining to the metering jet, desirably of brass or other metal derivation, which has functioned quite satisfactorily in the above described conduit, conforming with the device of Figs. 1–5, the overall length thereof may be approximately 1⅛ inches, with the stem portion having an approximate diameter of 5/32 inch and a length of approximately ⅝ inch; the length of the shoulder portion may be approximately ⅛ inch with an approximate 3/16 inch diameter, while the threaded end portion is approximately ⅜ inch in length, having an outside diameter of approximately ¼ inch, while the diameter at the base of the thread thereof is approximately 3/16 inch. The surface configuration of the tapered end desirably manifests a conical shape, which tends to minimize any possibility of extraneous particles depositing in proximity to the metering jet orifice and clogging the same. It will be noted that the said port 23 is of a uniform diameter throughout the entire length of the metering jet, exclusive of the tapered end thereof, extending through the aforesaid stem, shoulder and threaded end portion. As in the case of the dimensions indicated with respect to the conduit, the said dimensions referring to the metering jet are in no sense intended to be restrictive thereof.

Figures 7, 8:
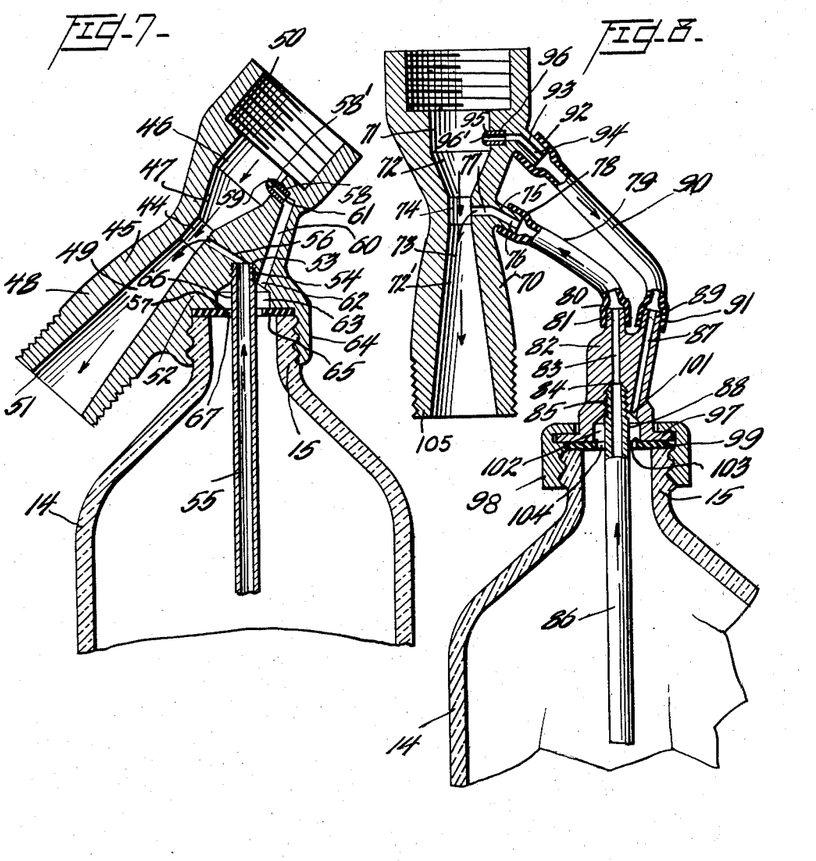
Fig. 7 indicates another preferred embodiment of the invention, presented in vertical longitudinal section.
Fig. 8 is illustrative of an additional modification of the invention, and is likewise shown as a longitudinal sectional view.

The fundamentals of concept and operation pertaining to the modification of Fig. 7 are fundamentally the same as those applicable to the embodiment of Figs. 1–5, and the details of consideration presented hereinabove are likewise generally pertinent. Thus conduit or flow line section 45 embraces the upstream or high pressure side 46, the corresponding venturi frustum being designated as 47. Similarly the downstream or low pressure side 48 includes the corresponding venturi frustum 49. Intervening the said respective high and low pressure sides of conduit 45 is the venturi throat 44.

The inlet end 50 of conduit 45 may be provided with any expedient means for attachment to the vehicle source of supply. Likewise appropriate conduit means or connections may be applied to outlet end 51 for conveying from conduit 45 the vehicle admixed with the chemical substance in predetermined proportion for ultimate distribution.

It will be noted that in this modification, header 52 is angularly disposed relative to the conduit 45, with which it desirably may be in the form of a unitary casting. This angular correlation of conduit 45 and header 52 merely affords an alternative expedient for facilitating the attachments and use of the device under conditions where another modification may be inconvenient or inexpedient. In this connection, the aforesaid angular relationship between the header and conduit may, in some instances, permit of a lesser conduit length than that which would be applicable where the device of Figs. 1–5 were utilized, in the event that a partial venturi, as referred to hereinabove, may be desirable.

The said header 52 provides a seat 53 adapted to receive the threaded end 54 of egress conduit 55, corresponding with conduit 19 of Figs. 1–5. Moreover a port or passage 56 extends through the body of header 52 from venturi throat 44 to the said seat 53, whereby a continuity of passage is afforded through egress conduit 55 and port 56 into the venturi throat 44 of conduit 45. It will be noted that Fig. 7 does not include a valve control in the said port 56, and under such circumstances, the device is intended for operation exclusively under conditions for supplying to the flowing stream of vehicle in conduit 45 chemical substance from container 14, there being no alternative for vehicle flow per se as in the embodiment of Figs. 1–5. It will however be understood that an appropriate valve means may be contemplated with respect to port or passage 56, if so desired, such as valve 21 shown in connection with the previously described device of Figs. 1–5.

In view of the angular relationship between header 52 and conduit 45, the said port 56 and egress conduit 55 likewise manifest an angular disposition with respect to each other. Accordingly when the attachment of conduit 45 to the source of vehicle supply is at an angle, the container 14 may nevertheless be maintained in a desirably upright position, i. e., in a vertical plane, which is particularly apropos where the chemical substance in container 14 is in the form of a liquid.

Metering jet 58, provided with port 58', projects at its orifice end 59 into high pressure side 46 of conduit 45, and may be press fitted, threaded or cast in the upper extremity of header 52, which in effect corresponds with the wall structure of conduit 45. The port or passage 60 extends through the body of the header from the outlet end 61 of metering jet 58, the end 62 of said passage 60 opening into zone 63 within the header. It will be noted that the port 58' comprises an enlarged diameter as compared with the orifice 59 of the metering jet; and the diameter of conduit 60 is substantially in excess of that pertaining to the said port 58'. Moreover the zone 63 represents a substantial expansion chamber relative to the said passage 60. Accordingly the combination of metering jet 58, passage 60, and zone 63 represents three stages of progressively enlarged expansion zones, together in effect comprising a continuous by-pass conduit.

The peripheral flange portion 64 of header 52 comprises an internally threaded closure device adapted to receive the externally threaded neck 15 of container 14. As shown in Fig. 7, gasket or washer 65, which may be of any material derivation, such as synthetic resin, rubber or the like, is interposed between the end of bottle neck 15 and the seat therefor within said closure means 64. The said gasket is adapted to afford an obstructive or baffle effect applicable to by-pass effluent liquid from zone 63, and desirably directs such effluent into an impinging relationship against surface portion 66 of egress conduit 55.

In the operation of the device shown in Fig. 7, the flowing stream of vehicle from the source of supply is conveyed through conduit 45 from high pressure side 46, through venturi throat 44 into the downstream side 48 to the outlet end 51. At the same time a relatively small by-pass flow will be effected through metering jet 58, that is into orifice 59 and through port 58'; thence through port 60 from which the effluent issues into zone 63, desirably in an impinging contact with surface portion 66 of egress conduit 55 as well as being subjected to the baffle function of a protruding portion 57 of gasket or washer 65. Accordingly the by-pass flow from conduit 45 is subjected in effect to three stages of expansion, in its course through port 58', passage or conduit 60, and zone 63, prior to being subjected to the aforesaid impingement and baffle effects.

As a result thereof, the effluent from zone 63 passes through opening 67 in the said washer or gasket 65, thence into the neck of the container, preferably at substantially the center thereof, as a relatively thin film of substantially reduced velocity, compared with the effluent in metering jet 58, and becomes "layered" or disposed relative to the surface of the chemical substance, substantially entirely without turbulence, affording a quiescent piston-like actuating force directed through a plane parallel to the surface of the chemical substance within container 14.

The quiescent pressure thus attained serves to expel chemical liquid from container 14 through egress conduit 55 and the port 56 in extension thereof, the latter opening into throat 44 comprising a low pressure area of the venturi. Thus the chemical concentrate becomes admixed with the flowing stream of vehicle in conduit 45, the proportionate content being accurately determined by the aforesaid metering jet 58. The resultant composition of vehicle containing chemical concentrate flows through the downstream side 48 of the said conduit 45, from which it passes at end 51 into any predetermined means for conveying the composition to the location at which its distribution is contemplated.

Further illustrative of the structural diversifications applicable to the invention is the modification shown in Fig. 8. The fundamental concept of this embodiment likewise conforms with that applicable to the device contemplated by Figs. 1–5 as well as with the modification described with reference to Fig. 7. Thus the fundamental structural characteristics and details of operation are applicable to this modification similarly to the indications hereinabove presented in the description directed to the embodiment of Figs. 1–5 and Fig. 71. An element of distinction relevant to Fig. 8 pertains to the combination of the vehicle flow line conduit or section with a header, each being a separate and distinct structural member spaced apart from the other, notwithstanding their combinative coordination in operative function.

Describing the respective details and elements of this modification, the vehicle flow line conduit or section 70 is internally provided with a flow restricting means, comprising a venturi, which may be either the full or partial type, as referred to hereinabove. Thus 71 is the inlet and high pressure side of conduit 70, with 72 designating the upstream frustum of the venturi. Coordinately the downstream and low pressure side 72' of conduit 70 embraces the downstream frustum 73. The venturi throat 74 is, pursuant to the characteristics of this flow restricting means, interposed between the aforesaid high pressure or upstream frustum 72 and the relatively low pressure or downstream frustum 73.

The projection 75 of conduit 70, desirably in the form of a unitary casting with said conduit, provides a port 76, which is in extension of port or passage 77 through the wall of conduit 70, said port 77 opening into the venturi throat 74. One end 78 of a flexible conduit 79, which may be a rubber hose connection or of synthetic resin or flexible metal fabrication, is fitted over projection 75, and the other extremity 80 of said conduit 79 is similarly stretched to an appropriate fit over projection 81 of header 82. The port or passage 83 extends longitudinally through the header 82 from the extremity of projection 81 to the seat or recess 84, provided with internal threads adapted to receive the externally threaded end portion 85 of egress conduit 86, corresponding with egress conduits 19 or 55.

The passage or conduit 87 likewise extends longitudinally of header 82 and is angularly disposed with respect to port or conduit 83 in a manner to effect substantial impingement of the liquid emerging from conduit 87 on the surface of portion 88 of said egress conduit 86. The said port or passage 87 extends through projection 89 of header 82, and a flexible tube or connection 90, similar to conduit 79, is fittedly correlated at its end 91 with said projection 89. The opposing end 92 of conduit 90 is likewise appropriately coordinated with projection 93, which affords an outlet or passage 94 from the high pressure side 71 of conduit 70, through metering jet 96. As in the instance of projection 75, projection 93 may, if desired, comprise a unitary casting with conduit 70.

The port or passage 94 in projection 93 extends inwardly through the wall structure of conduit 70 to coordinate with the port 95 of metering jet 96, which may be press fitted, threaded or otherwise integrally coordinated with the wall of conduit 70, for example as a unitary casting. As a preferred expedient, the said metering jet 96 projects into said conduit 70 in order to minimize any clogging tendency by extraneous particles, for reasons indicated in the consideration hereinabove with reference to the description pertaining to the metering jet 22 in the embodiment of Figs. 1–5, and similarly applicable to metering jet 58 in the modification of Fig. 7.

Thus the coordination of ports, passages, and zones pertaining to the by-pass flow of vehicle from the high pressure side of conduit 70 in effect subjects the said flow to three stages of sequential or progressive expansion. Similarly to the characteristics of the bypass flow described in the operation of the device shown in Figs. 1–5 and the embodiment disclosed in Fig. 7, the correlation applicable to the modification of Fig. 8 serves to effect reduction in the velocity of the said by-pass effluent to the extent that its supply to container 14 may be substantially non-turbulent and quiescent. In this connection, the port 95 is materially enlarged with reference to orifice 96′ of the metering jet 96. Moreover the port 94 which coordinates the capillary passage 95 with flexible conduit 90 which in turn is correlated with port 87, is of comparatively greater diameter than the said passage 95. The conduit or passage 90 is at least equal to and may be larger than the diameter of port or passage 94, the latter being substantially equivalent in its diameter with the said port or passage 87. Furthermore it should be noted that the zone 102 within the header affords a substantial enlargement compared with the diametric dimension of the said ports or passages 94, 90 and 87. In summary, the progressive spacial enlargement affecting the by-pass flow comprises (1) metering jet port 95; (2) passages 94 and 87 with intervening conduit 90; and (3) zone 102 as aforesaid, these cumulatively in effect comprising a continuous or integral by-pass conduit.

The peripheral flange portion 97 of header 82 comprises a seat for swivel bottle cap 98, which is internally threaded to receive the external threads of neck portion 15 of bottle container 14, with washer or gasket 99 interposed between the bottle opening and the undersurface of the said flange 97. Thus by attaching the said container 14 to swivel closure 98, the container is integrally coordinated with header 82.

The operative features of the structure shown in Fig. 8 are predicated on principles conforming with those of the previously described embodiments, as aforesaid. Likewise the variations in structural details as well as operative function which may be applied to or effected in the other modifications are in essence applicable to the device of Fig. 8. In this connection, where the metering jet is threadedly attached to the header in the modifications of Figs. 7 or 8, similarly to the removable coordination of metering jet and header shown in the embodiment of Figs. 1 and 3, the concentration of the chemical substance in the flowing stream of vehicle may be subject to variation by replacement of the metering jet with one affording the requisite orifice size to provide the predetermined concentration.

In the utilization of this apparatus, the supply of chemical substance from container 14 is actuated by the flowing stream of vehicle in conduit 70, and the combinative correlation of the various members of the device are adapted to provide an efficient operation, including an accurate fixed concentration of chemical substance in the vehicle.

Considering in further detail the operation of the said embodiment of Fig. 8, the vehicle, such as water, from any expedient source of supply flows through appropriately attached means into conduit 70 at the inlet end thereof. As the vehicle stream moves through conduit 70, a by-pass flow is effected through metering jet 96, comprising inlet orifice 96′ and port 95, thence through passage 94 of projection 93, into the flexible conduit or hose 90.

From said conduit 90, the by-pass liquid flows into the passage 87 at projection 89 of header 82, and emerges therefrom at end 101 of said passage 87 into zone 102, which emergence may be desirably in an inpinging relationship with the surface of portion 88 of egress conduit 86. Similarly the inner surface 103 of gasket or washer 99 functions as a baffle to the effluent in zone 102, and serves to direct the same toward the surface portion 88 of egress conduit 86.

By virtue of the abrupt zone enlargement 102, relative to the combined passages or conduits 87, 90, 94, which represent an expansion zone relative to metering jet 96, and supplemented by the contributive baffle function of gasket or washer 99 as well as the impingement of the by-pass flow on portion 88 of egress conduit 86, the said liquid effluent flows through opening 104 of gasket or washer 99 at a substantially reduced velocity relative to that in metering jet 96 or the supplementary passages or ports including 94, 90 and 87. As previously indicated hereinabove, where the liquid chemical concentrate does not fill container 14, which may be the case where the container and its contents are, for the first time, coordinated with the proportioning device, the by-pass film or liquid modicum may assume a channelled flow along egress conduit 86 until the surface of the liquid within the container is contacted. On the other hand, after the commencement of the operation, with the container filled by the chemical content therein together with the superimposed liquid vehicle resulting from the by-pass effluent, substantially little, if any, flow of vehicle along conduit 86 will be manifested. In any event, the said film or liquid modicum is channelled in its passage from zone 102 through opening 104 into substantially the diametric center of neck 15 of container 14, in an essentially quiescent state relative to a surface of the chemical liquid or concentrate within said container 14.

Thus under the aforesaid optimum conditions, the effluent by-pass is deposited within container 14 without any attendant turbulent or agitating effect, and in view thereof the vehicle by-pass within container 14 is enabled to function as a quiescent piston-like actuating medium for expelling the chemical liquid or concentrate from the said container. The course of the chemical liquid dispensed from said container 14 is through egress conduit 86, into port or passage 83, thence through flexible conduit 79 and port 76 of projection 75, from which it flows through port 77, ultimately emerging at venturi throat 74 for admixture with the flowing stream of vehicle within the main vehicle flow conduit 70. It will be understood that, if desired, a valve means, such as that illustratively shown in Figs. 1–3, may be correlated with the modification of Fig. 8, and such a valve may expediently be positioned in association with port 77.

As previously described, pursuant to the function and characteristics of the device, the resultant admixture of chemical concentrate and vehicle in venturi throat 74 corresponds with a predetermined fixed ratio of proportioning. The resultant composition passes through the low pressure side 72′ of conduit 70, and into any means coordinated with or attached to end 105 of conduit 70, for conveying the admixture of vehicle and chemical substance to the desired area at which it is to be dispensed in any preferred manner.

As hereinabove noted, the apparatus modifications shown in the respective figures of the drawings are essentially illustrative of the concept and optimum or preferred embodiments of the invention, which lends itself to substantially deversified ramifications and variations in structure and procedure. In this connection, the quiescent piston-like actuating medium, pursuant to the present invention, comprises a novel feature which may be utilized per se, although it will be understood that the combinative association therewith of the preferred metering or proportioning details described herein afford optimum attributes in the production and function of the said liquid actuating medium as well as in the concentration control.

Similarly the coordination of the metering jet as a by-pass between the high pressure side of the vehicle flow line and the chemical container, with the egress conduit from the container correlated with ports or passages directing the chemical substance to the throat portion of a venturi, affords an optimum accuracy of controlled proportioning not afforded by other flow restricting means or by a different coordination of parts. Accordingly such features of proportioning control may be utilized notwithstanding any adaptation of a non-turbulent piston-like actuating medium within the container 14.

It will however be understood that the arrangement and positioning of the various elements or parts of the device may be subject to substantial diversification, while retaining the various features of invention herein, and without departing from the principles and scope of the invention. This is illustrated by resort to a flow restricting means other than a venturi in the vehicle flow line, or by positioning the metering jet in the egress flow from the chemical container to the flow restricting means. Notwithstanding any discrepancies in the resultant proportioning, advantages may nevertheless be attained in the adaptation of the aforesaid quiescent fluid actuating medium.

Moreover and notwithstanding the optimum correlation of the metering jet with the ports and passages to effect a three-stage zone enlargement, applicable to the by-pass flow, as indicated with respect to the embodiment of the devices described, this may be subject to variation within the purport and latitude of the invention. Thus there is no intent to be restricted in terms of the number of expansion or enlargement zones which may be resorted to, the contemplation being to attain a practicable conversion of the by-pass or diverted flow to a substantially non-turbulent disposition or "layering" thereof within container 14, for affording the desired quiescent and efficient piston-like actuating medium. It will accordingly be understood that four or more expansion or enlargement zones may be applicable, and by the same token, the number of zones may be reduced to one or two, the attendant requisite being to effect the quiescent disposition of the diverted or by-pass flow within the container.

By the same token, the baffle and impingement factors, which contribute to the optimum velocity reduction are not limitative in their utilization, since the aforesaid plural stage and abrupt zone enlargements alone may afford substantially quiescent or non-turbulent disposition of the by-pass flow within the container 14. However as previously stated, subjecting the by-pass liquid to flow obstructive means correlated with the flow-diverting conduit, such as the respective or the cumulative effect of baffle obstruction and/or impingement as well as the plural stage zone enlargements result in the optimum conditions for attaining the desired quiescent piston-like liquid actuating means applicable to the chemical substance within the container.

Indicative of additional changes applicable where it is desired to direct the chemical concentrate to the bottom of the container, the following pertains to Figs. 7 and 8. In Fig. 7, the egress conduit 55 may be integrally coordinated with port 60, whereby the egress of chemical concentrate from the container will be directly through opening 67 and port 56. Similarly with reference to Fig. 8, egress conduit 86 may be correlated with port 87, the egress flow of concentrate from the container being through opening 104, passage 83, conduit 79 and port 76.

Among other possibilities of variation, an angularly disposed plane of pressure may be effected relative to the chemical surface in the container, in lieu of the preferable horizontal plane of liquid vehicle through which the vertical actuating force is otherwise manifested, i. e., pursuant to the optimum modifications of the device described herein. Likewise baffle or obstructing elements may be provided in the enlarged zone to which the by-pass effluent flows prior to its entry into the container.

There is no intent to be restricted in terms of applicable dimensions of the respective members or parts of the device. It should however be clear that the dimensional characteristics will conform with the requisite function of the various members comprising the coordinated device herein, and the latitude of the dimensions will be apparent to one versed in the art, in view of the teaching herein. Similarly the material from which the various parts of the apparatus or device may be fabricated is not restrictive, and may be subject to diversification, pursuant to the dictates of practicability and economic feasibility. In addition, the configuration of the various elements or parts embodied in the invention may also be subject to wide variations.

Pursuant to the invention, a novel, sturdy dispensing and proportioning device is afforded, manifesting such attributes as extreme portability, structural simplicity and enhanced operative efficiency. Moreover the wide utility of the invention is indicated by its adaptation for effecting an emulsification or dispersion of the chemical substance within the flowing stream of vehicle, where the relative properties of the vehicle and chemical substance lend themselves to the forming of an emulsion or dispersion to be dispensed. The diversified adaptations to which the invention pertains are further illustrated by its use for proportional dispensing of insecticides, fungicides, fertilizers, disinfectants, detergents, cleaning compositions, wetting agents, etc.

Additional evidence of the applicable flexibility and versatility of the invention is the fact that the proportioner devices within the scope thereof may be correlated, for efficient operation, with any point in the vehicle flow line, irrespective of the length thereof, and notwithstanding the resort to a spray nozzle, straight stream nozzle, or automatic sprinkler for the distribution of the vehicle containing chemical concentrate in predetermined ratio. Thus a pertinent feature is predicated on the introduction of the concentrate at any point in the flow line without materially affecting the pressure, thereby permitting efficient and expedient operation when the chemical substance is being applied through a spray or lawn sprinkler, for example.

In brief the novelty and utility of the invention as described herein, especially in its optimum embodiments, provides attributes and advantages not heretofore attainable in the art of proportioning chemical substances in a flowing stream of fluid, which may function as a vehicle for the chemical substance, whether or not per se it comprises an active chemical reagent in the field of application. In this connection, the term "fluid" and the term "liquid," as utilized in the specification as well as in the appendant claims, are both intended to embrace a suspension or dispersion in the normal definitive significance of the said terms "suspension" and "dispersion," solid or liquid particles being contemplated as within the scope of the disperse or suspended phase and a liquid comprising the continuous phase.

While we have described our invention in accordance with desirable embodiments, it is obvious that many changes may be made in the details of procedure and construction, as well as in the combination and arrangement of parts, without departing from the scope or spirit of the invention as defined in the following claims.

Having thus set forth our invention, we claim:

1. An attachment device comprising a combined header and container closure means and adapted for the preparing and dispensing of a liquid mixture, said device being expediently attachable to and removable from a container, the combination comprising a main conduit, means in said main conduit for effecting a pressure differential determining high and low pressure sides therein during the flow of liquid therethrough, a flow-diverting conduit connected with the high pressure side of the main conduit and adapted for a divergent flow of liquid from the said main conduit, the said flow-diverting conduit providing at least one comparatively enlarged zone relative to the smallest diameter thereof, the said enlarged zone being within the header and contiguous the outlet end of the flow-diverting conduit and adapted for coordination with the opening of a container, flow-obstructive means correlated with the flow-diverting conduit, the said enlarged zone and flow-obstructive means being adapted for substantially reducing the velocity of liquid, passing from the main conduit, in an extent conductive to a quiescent disposition of the diverted flow contiguous the outlet end of the said flow-diverting conduit, and a conduit adapted for the egress flow of liquid into the said low pressure side of the main conduit.

2. An attachment device comprising a combined header and container closure means and adapted for the preparing and dispensing of a liquid mixture, said device being expediently attachable to and removable from a container, the combination comprising a main conduit, a venturi-type flow-restricing means in said conduit for effecting a pressure differential determining high and low pressure sides therein during the flow of liquid therethrough, a flow-diverting conduit connected with the high pressure side of the main conduit and adapted for a divergent flow of liquid from the said main conduit, the said flow-diverting conduit providing at least one comparatively enlarged zone relative to the smallest diameter thereof, the said enlarged zone being within the header and contiguous the outlet end of the flow-diverting conduit and adapted for coordination with the opening of a container, flow-obstructive means correlated with the enlarged zone of the flow-diverting conduit, the said enlarged zone and flow-obstructive means being adapted for substantially reducing the velocity of liquid, passing therethrough from the main conduit, in an extent conducive to a quiescent disposition of the diverted flow contiguous the outlet end of the said flow diverting conduit, a conduit adapted for the egress flow of liquid into the low pressure side of the main conduit, and a metering means adapted to afford a predetermined ratio of the divergent flow to the flow in the main conduit.

3. An apparatus as in claim 2 wherein the metering means is positioned at the inlet end of the flow-diverting conduit and comprises a metering jet having an orifice inlet and a passage of comparatively enlarged diameter relative to the said orifice, said orifice being of a predetermined ratio relative to the throat portion of the flow-restricting means, the relationship of the said orifice to the throat portion being adapted to afford a substantially fixed ratio through a wide range of pressure and flow in the said main conduit.

4. An apparatus as in claim 2, wherein the flow-obstructive means comprises the exterior surface portion within the header of the conduit adapted for the egress flow of liquid into the said low pressure side of the main conduit, the said conduit being coordinated with the enlarged zone at the outlet end of the flow-diverting conduit.

5. An apparatus as in claim 3, wherein the flow-diverting conduit comprises a plurality of progressively enlarged zones, the zone of maximum enlargement being within the header contiguous the outlet end of said flow-diverting conduit, and the conduit adapted for the egress flow of liquid into the low pressure side of the main conduit is connected with the throat portion of the venturi-type flow-restricting means.

6. An apparatus as in claim 5, wherein the flow-obstructive means comprises the exterior surface portion within the header of the conduit connected with the throat portion of the flow-restricting means.

7. An apparatus as in claim 5, wherein the flow-diverting conduit and the egress conduit connected with the throat portion of the venturi-type flow-restricting means extend through the header adapted for attachment to a container, and the flow-obstructive means comprises the exterior surface portion within the header of the said egress conduit adapted for the flow of liquid into the throat portion of the flow-restricting means together with a gasket within the header, said gasket being adapted to afford a baffle function, the said egress conduit being substantially centrally positioned within the header.

8. An apparatus for the admixing and dispensing of liquids from a container comprising a main conduit, means in said main conduit for effecting a pressure differential determining high and low pressure sides therein during the flow of liquid therethrough, a closed container having liquid therein, a flow-diverting conduit connecting the high pressure side of the said main conduit with the inside of the said container, said flow-diverting conduit being adapted for effecting a divergent flow of liquid passing through the said main conduit, a conduit connecting the inside of the container with the low pressure side of the main conduit and adapted for the egress flow of liquid from the container into the said low pressure side of the main conduit, the said flow-diverting conduit providing a plurality of progressively enlarged zones relative to the smallest diameter thereof, the zone of maximum enlargement being contiguous the outlet end of the flow-diverting conduit and substantially above the container opening, the said progressively enlarged zones being adapted for substantially reducing the velocity of divergent flow from the high pressure side of the main conduit into the container in an extent for effecting a quiescent disposition of said divergent flow relative to a surface of the liquid within the container, thereby effecting a substantially non-turbulent displacement of the liquid from within the container through the said conduit for the egress flow into the main conduit, and a metering means adapted to afford a substantially fixed ratio of the divergent flow to the flow in the main conduit.

9. An apparatus for the admixing and dispensing of liquids comprising a main conduit, a venturi-type flow-restricting means in said main conduit for effecting a pressure differential determining high and low pressure sides within said conduit during the flow of liquid therethrough, a container having an opening therein, said container being substantially filled with liquid, means comprising a combined header and closure adapted for removable attachment to said container at said opening, a flow-diverting conduit connecting the high pressure side of the said main conduit with the inside of the said container through the said header and closure means, the said flow-diverting conduit being adapted for effecting a divergent flow of liquid passing through the said main conduit, an egress conduit connecting the opening of the container through the said header and closure means with the low pressure side of the main conduit and adapted for the egress flow of liquid from the container into the low pressure side, the said flow-diverting conduit providing a plurality of progressively enlarged zones relative to the smallest diameter thereof, the zone of maximum enlargement being within the header contiguous the outlet end of said flow-diverting conduit and substantially within the container opening, said progressively enlarged zones being adapted for substantially reducing the velocity of divergent flow from the high pressure side of the main conduit into the container in an extent for effecting a quiescent disposition of the said divergent flow relative to a surface of the liquid within the container, thereby effecting a substantially non-turbulent displacement of the liquid within the container through the said conduit for the egress flow into the main conduit, and a metering means adapted to afford a substantially fixed ratio of the divergent flow to the flow in the main conduit.

10. An apparatus as in claim 9, wherein the inlet end of the flow-diverting conduit comprises a metering jet having an orifice inlet and a passage of comparatively enlarged diameter relative to the said orifice, and wherein the egress conduit is connected with the throat portion of the venturi-type flow-restricting means.

11. An apparatus as in claim 9, wherein the inlet end portion of the flow-diverting conduit comprises a metering jet having an orifice inlet and a passage of comparatively enlarged diameter relative to the said orifice, and flow-obstructive means are correlated with the flow-diverting conduit for supplementing the velocity reduction in the divergent flow.

12. An apparatus as in claim 10, having flow-obstructive means correlated with the flow-diverting conduit for supplementing the velocity reduction in the divergent flow, the said means comprising the exterior surface portion within the header of the egress conduit, the said egress conduit being coordinated with the outlet end of the flow-diverting conduit.

13. An apparatus as in claim 11, wherein the container is a bottle having a relatively narrow threaded neck portion at the open end thereof, and the means comprising a closure adapted for removable attachment is a header having a threaded portion for receiving the said externally threaded neck portion of the bottle container, in coordination with the said conduits.

14. An apparatus as in claim 13, wherein the conduit for the egress flow of liquid from the container extends longitudinally within the container, the end portion of the said egress conduit terminating adjacent to and spaced apart from the container bottom, wherein the upper end of the conduit for the egress flow of liquid from the container extends through the body of the header and is provided with a valve controlled port adapted for closing the flow from the container to the main conduit, and wherein the flow-diverting conduit is angularly disposed relative to the egress conduit within the container in order to effect the impingement of the diverted flow on the surface of the egress conduit comprising the flow-obstructive means.

15. An apparatus as in claim 9, wherein the said flow-diverting conduit is coordinated with baffle and impingement means at least at the zone of maximum enlargement contiguous the outlet end of the flow-diverting conduit, thereby supplementing the velocity reduction.

16. An apparatus as in claim 9, wherein the container is a bottle having a relatively narrow externally threaded neck portion at the open end thereof, wherein the means comprising a closure adapted for removable attachment is a header having an internally threaded portion for receiving the said externally threaded neck portion of the bottle container, wherein the inlet end portion of the flow-diverting conduit comprises a metering jet having an orifice inlet, wherein the conduit for the egress flow of liquid from the container is coordinated with the throat portion of the venturi, the said conduit being provided with a valve controlled port adapted for closing the flow from the container to the main conduit, and wherein the metering jet is removably and replaceably seated in the header to permit predetermined changes in the proportioned concentration of the liquids being dispensed.

17. An apparatus as in claim 16, wherein the flow-diverting conduit is angularly disposed relative to the egress conduit within the container and adapted for the impingement of the divergent flow on the exterior surface portion of the egress conduit within the zone of maximum enlargement adjacent the outlet end of said flow-diverting conduit, and wherein a gasket interposed between the header closure and the rim of the bottle neck is thereby positioned in proximity to the said enlarged zone and affords a baffle to the divergent flow within the said zone.

18. An apparatus as in claim 5 wherein the flow-diverting conduit and the egress flow conduit connected with the throat portion of the venturi-type flow-restricting means extend through the header adapted for attachment to a container, and the said flow-diverting conduit is angularly disposed relative to the said egress flow conduit, the divergent flow from the angularly-positioned flow-diverting conduit being adapted to impinge on the exterior surface of the said egress flow conduit.

19. In an apparatus comprising an attachment device applicable to a container and adapted for the proportioned admixture and dispensing of liquids, a main conduit, a venturi in said main conduit for effecting a pressure differential determining high and low pressure sides therein during the flow of liquid therethrough, a flow-diverting conduit connected with the high pressure side of the main conduit and adapted for a diverted flow of liquid from the said main conduit, a conduit connected with the throat portion of the venturi in the said main conduit, a metering jet having an orifice inlet and a passage of comparatively enlarged diameter relative to the said orifice, said metering jet comprising the inlet end portion of said flow-diverting conduit, said orifice being of a predetermined ratio relative to the venturi throat portion, the relationship of the said orifice to the said venturi throat portion being adapted to afford a substantially fixed ratio through a wide range of pressure and flow in the said main conduit, a header adapted for attachment to a container, both the said flow-diverting conduit and the said conduit connected with the throat portion of the venturi extending hrough he said header, the said metering jet being removably and replaceably seated in the header to permit predetermined changes in the proportioning concentration, the end of the metering jet opposite the orifice being relatively enlarged and externally threaded for removable attachment to an internally threaded seat in the said header, and a valve means in the said conduit connected with the throat portion of the venturi for controlling the flow of liquid therethrough.

References Cited in the file of this patent

UNITED STATES PATENTS

| | | |
|---|---|---|
| 1,466,247 | Pickop | Aug. 28, 1923 |
| 1,681,362 | Pike | Aug. 21, 1928 |
| 1,769,266 | Lusier | July 1, 1930 |
| 1,769,428 | Gatchet | July 1, 1930 |
| 1,868,893 | Gentle | July 26, 1932 |
| 1,887,836 | Faber | Nov. 15, 1932 |
| 1,905,953 | Strasburger | Apr. 25, 1933 |
| 2,044,821 | Urban | June 23, 1936 |
| 2,058,901 | McPherson | Oct. 27, 1936 |
| 2,235,278 | Brunner | Mar. 18, 1941 |
| 2,302,799 | Peterson | Nov. 24, 1942 |
| 2,388,445 | Stewart | Nov. 6, 1945 |
| 2,421,372 | Burke | June 3, 1947 |
| 2,507,410 | Kemp | May 9, 1950 |
| 2,536,361 | Flanders | Jan. 2, 1951 |
| 2,538,948 | Richards | June 27, 1951 |
| 2,562,415 | Chase | July 31, 1951 |
| 2,592,884 | Fox et al. | Apr. 15, 1952 |
| 2,599,678 | Walker | June 10, 1952 |
| 2,601,672 | Gatchet | June 24, 1952 |
| 2,628,129 | Hosmer | Feb. 10, 1953 |